United States Patent
Renard et al.

(10) Patent No.: US 6,317,078 B1
(45) Date of Patent: Nov. 13, 2001

(54) METHOD AND DEVICE FOR RECEPTION PROCESSING OF A GPS SATELLITE L2 SIGNAL

(75) Inventors: Alain Renard, Chabeuil; Marc Revol, Cachan, both of (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/554,600

(22) PCT Filed: Sep. 24, 1999

(86) PCT No.: PCT/FR99/02277

§ 371 Date: May 25, 2000

§ 102(e) Date: May 25, 2000

(87) PCT Pub. No.: WO00/19229

PCT Pub. Date: Apr. 6, 2000

(30) Foreign Application Priority Data

Sep. 25, 1998 (FR) .................................................. 98 12022

(51) Int. Cl.[7] .............................. H04B 7/185; G01S 5/02
(52) U.S. Cl. ............................... 342/357.05; 342/357.12; 701/213
(58) Field of Search .................... 342/357.05, 357.12; 701/213

(56) References Cited

U.S. PATENT DOCUMENTS

| | | |
|---|---|---|
| 5,576,715 | * 11/1996 | Litton et al. . |
| 5,621,416 | * 4/1997 | Lennen . |
| 5,736,961 | * 4/1998 | Fenton et al. . |
| 5,781,152 | 7/1998 | Renard et al. . |
| 5,822,376 | 10/1998 | Renard . |
| 5,850,420 | 12/1998 | Guillard et al. . |

* cited by examiner

*Primary Examiner*—Theodore M. Blum
(74) *Attorney, Agent, or Firm*—Oblon, Spivak, McClelland, Maier & Neustadt, P.C.

(57) ABSTRACT

A method for position determination with the aid of GPS satellites, including reception processing of a GPS satellite signal L2 modulated by an encrypted code Y having a key not available from the GPS satellite, so as to assess a delay of the signal L2 with respect to the signal L1 and to deduce therefrom the magnitude of the ionospheric effect so as to take account thereof and improve the accuracy of the location finding. This processing includes reducing the signal L2 to a lower band and in despreading the signal L2 by means of the non-encrypted code P produced locally in reception by a local generator of a non-encrypted spreading code P synchronized with the code Y (encrypted P) transmitted, with the aid of a phase lock loop with three parallel paths: a first path demodulated by a precise version of the locally produced non-encrypted spreading code P, a second advanced path demodulated a first time by an advanced version of the locally produced non-encrypted spreading code P and a second time by the demodulated signal of the precise path, and a third delayed path demodulated a first time by a delayed version of the locally produced non-encrypted spreading code P and a second time by the demodulated signal of the precise path, synchronization being achieved by searching for an equality of power of the carrier of the signal L2 at the output of the advanced and delayed paths.

11 Claims, 2 Drawing Sheets

METHOD AND DEVICE FOR RECEPTION PROCESSING OF A GPS SATELLITE L2 SIGNAL

BACKGROUND OF THE INVENTION

The present invention relates to position determination with the aid of the GPS satellites of the NAVSTAR system. It relates more specifically to the reception processing of a GPS satellite signal L2 modulated by an encrypted code.

DICUSSION OF THE BACKGROUND

The NAVSTAR system is a system for positioning and for navigation around the globe by means of a cluster of flyby satellites. The satellites, 24 in number, are distributed over six fixed 12-hour orbital planes in such a way as to ensure the most regular possible terrestrial coverage at a rate of four satellites per orbital plane. Their positions are known accurately at any instant. They are provided with mutually synchronized clocks and emit signals which make it possible, when they are in direct line of sight of a receiver, to determine the distances between them and the receiver and consequently, knowing their positions, to deduce therefrom that of the receiver by triangulation.

A source of inaccuracy is due to the crossing of the ionosphere by the waves originating from the satellites orbiting at an altitude of greater than 20,000 kilometres. This is because, on crossing this medium charged with electrons, the waves undergo refractions which decrease their apparent speed. It is known practice to measure the effect of the ionosphere on the propagation of the waves originating from the satellites on the basis of the delay appearing on reception between two waves of different frequencies emitted coherently since the propagation delay due to the ionosphere which depends on the concentration of electrons, varies, to a first approximation, as an inverse function of the square of the frequency. This measure of the effect of the ionosphere is one of the justifications of the fact that each GPS satellite emits on two different frequencies in the L band.

More specifically, each GPS satellite emits on two carriers in the L band: a carrier Li at 1575.42 MHZ and a carrier L2 at 1227.60 MHZ. These carriers are phase modulated according to the BPSK (Binary Phase Shift Keying) technique by a pseudo-random binary sequence called the spectrum spreading code or PRN (Pseudo Random Noise), and by a satellite navigation signal which is referred to as data. More specifically, the carrier L1 is doubly modulated, in phase by a Coarse Acquisition C/A spreading code and the data, and in quadrature by a Precise P or an encripted P (Y) spreading code if it is jammed, and the data whereas the carrier L2 is simply modulated by the spreading code P(Y) and the data.

The modulation of the carriers L1 and L2 by pseudo-random binary sequences causes a spreading of the frequency spectrum of the signals emitted which are then less sensitive to jamming and to interference. In a satellite, all the codes are synchronous. The collection of signals: carriers, spreading codes and data, are coherent, the transitions of the navigation messages corresponding exactly to any possible transitions of the pseudo-random codes which themselves have a very accurate phase relationship with the carriers which themselves derive from a very stable unique clock.

The C/A and P(Y) spreading codes are individualized and different for each satellite so as to make it possible to distinguish the satellites from one another. The C/A spreading code has a length of 1,023 bits with a rating of 1.023 MHz, thereby giving it a duration of 1 millisecond and an occupied frequency bandwidth of about 2 MHz. The spreading code P(Y) has a duration of greater than 7 days with a rating of 10.23 MHz, thereby giving it an occupied frequency bandwidth of around 20 MHz. The C/A and P spreading codes are known. The jammed version Y of the spreading code P, which is that emitted most of the time, in fact more than 99.9% of the time, is on the other hand unknown to the civil user so as to avoid the possibility that one is able by a countermeasure to imitate the signal from a GPS satellite and falsify the positional pinpointing.

The distance from a receiver to a GPS satellite is measured by the time span which elapses between the instance of emission by the satellite, of a start of a characteristic pattern of a C/A or P(Y) pseudo-random spreading code and the instant of reception at the receiver of this same start of pattern. This time span is not directly accessible since the discrepancy between the clock of the satellites and that of the receiver is not known at reception. One only has access to a pseudodistance measured with respect to the clock of the receiver, thereby making it necessary, in order to remove the uncertainty with regard to the clock of the receiver, to resort to an additional satellite in the triangulation.

The accuracy of the position measurement depends on the accuracy with which one is capable of pinpointing the start of a pattern. It is better with the spreading code P(Y) of which the wavelength of one binary element is of the order of 30 metres than with the C/A spreading code of which the wavelength of one binary element is of the order of 300 metres. This is why it is usual to carry out a first location finding with the aid of the C/A (standing for "Coarse Acquisition") spreading code and then to refine this first location finding with the aid of the P(Y) (P standing for "Precise") spreading code. However, for civil use, where the key of the code Y (encrypted P) is not available, the positional pinpointing is performed on the basis of the C/A spreading code alone. One therefore has inferior accuracy. One may nevertheless hope for a location-finding accuracy of the order of a few metres since it is possible to pinpoint a start of pattern with the accuracy of one hundredth of the length of a binary element of the C/A spreading code. However, to achieve this accuracy, the ionospheric effect must be taken into account. For a user who has access to the key for enciphering the spreading code Y (encrypted P), this is not a problem since it is easy for him to measure the relative propagation delay existing between the patterns of the carriers Li and L2, and to deduce therefrom the delays affecting the carriers L1 and L2 due to the ionosphere. After correcting the satellite group delays, it is sufficient for this user to carry out the demodulations of the two carriers L1 and L2 by translation into lower band and correlations with spreading codes Y (encrypted P) produced locally in reception and phase-adjusted so as to be in synchronism with the spreading codes Y (encrypted P) modulating the two signals received on the carriers L1 and L2, then to measure the relative delay between the two locally produced spreading codes Y. The problem is entirely otherwise for a user who does not have access to the code Y (encrypted P) since he can no longer demodulate the carrier L2.

To solve this problem, various approaches have already been proposed:

A first approach consists in performing a cross correlation between the signals L1 and L2 since the signals L1 and L2 emitted by one in the same satellite are modulated coherently by the same spreading code Y (encrypted P). This cross correlation has the drawback of considerably increasing the noise power while the signal-to-noise ratio of the signals received is already very low. Furthermore, it does not make it possible to separate the various GPS satellites, nor to obtain a measurement on the carrier (speed).

A second approach of superior performance takes into consideration the fact that a spreading code Y (encrypted P) results from the product of the non-encrypted spreading-code P occupying a frequency band of the order of 20 MHz times a binary encryption code W occupying a frequency band which is forty times smaller, of the order of 500 kHz. It consists in demodulating the carrier L2 modulated by a spreading code Y (encrypted P) by means of the code P itself non-encrypted produced locally in reception by means of a spreading code generator phase-locked in such a way as to obtain maximum power for the demodulated signal obtained limited to a frequency band of 500 kHz and to square the signal emanating from the demodulation so as to eliminate any biphase modulation. Here one utilizes a despreading which causes the frequency band of the signal received to pass from 20 MHz to 500 kHz so as to gain in a ratio 40 with regard to the noise as compared with the first approach. The phase locking of the local generator of the spreading code P is then carried out according to a conventional technique known by the initials DLL (Delay Locked Loop).

This technique is implemented with the aid of a feedback control loop comprising:

the local generator of the non-encrypted spreading code P provided with a phase-shifting control, a demodulator driven on the one hand by the signal from the local generator of the non-encrypted spreading code P and, on the other hand by the signal L2 received and translated into lower band, a band filter limiting the passband of the output signal from the demodulator to a width of 500 kHz around the carrier of the signal L2 translated into lower band, a circuit for squaring the demodulated and filtered signal eliminating the biphase modulation, a circuit for measuring the power of the frequency line at twice the signal L2 carrier translated into lower band appearing in the demodulated, filtered and squared signal, and a loop monitoring circuit controlling the local generator of the non-encrypted spreading code P, with an output of half a binary element in advance and another output of half a binary element of delay, and monitoring the phase shift of the local generator of the spreading code in such a way as to obtain, in both cases, advance and delay, equal powers for the frequency line at twice the signal L2 carrier translated into lower band appearing in the demodulated, filtered and squared signal.

SUMMARY OF THE INVENTION

The purpose of the present invention is to improve the signal-to-noise ratio in the phase lock loop of the local generator of the non-encrypted spreading code P so as to obtain greater effectiveness in locking and so as to succeed more easily in synchronizing the locally produced non-encrypted spreading code P with the spreading code Y (encrypted P) modulating a signal L2 on transmission.

Its subject is a method for the reception processing of a GPS satellite signal L2 modulated by a spreading code Y (encrypted P) whose encryption signal W one is unaware of, so as to deduce a pseudodistance therefrom. This method consists in:

estimating the Doppler effect affecting the signal L2, transposing the signal L2 into lower band with the aid of at least one fixed carrier produced locally during reception and translated by the expected Doppler shift of the signal L2, demodulating in parallel on three paths the signal L2 obtained in lower band with the advanced, precise and delayed versions of a non-encrypted spreading code P which are produced by an adjustable-phase spreading code local generator, filtering the three demodulated signals obtained with filters matched to the phase and to the frequency of the encryption signal W limiting their passbands to around 500 kHz, once again demodulating the two demodulated and filtered signals resulting from the demodulations by the advanced and delayed versions of the non-encrypted spreading code P which is produced locally by the demodulated signal resulting from the demodulation by the precise version of the locally produced non-encrypted spreading code P so as to delete any biphase modulation, calculating the respective powers of the two doubly demodulated signals obtained from the advanced and delayed versions of the non-encrypted spreading code P, locking the phase of the local generator of the non-encrypted spreading code P so as to obtain two doubly demodulated signals (one advanced, the other delayed) of equal powers, and deducing a pseudodistance from the phase taken by the local generator of the non-encrypted spreading code P when its phase lock is latched.

According to this method, the phase-locking of the local generator of the non-encrypted spreading code P is achieved by virtue of a loop with three combined parallel paths operating simultaneously rather than sequentially, thereby improving the signal-to-noise ratio of the useful signal in the loop, by a ratio of four made up of a ratio of two due to the simultaneous operation of the advance and delay paths and of a ratio of two due to the fact that one no longer carries out a simple squaring of the demodulated and filtered signals of the advance and delay paths but the products of these signals times that demodulated and filtered of the precise path which has the advantage of exhibiting twice as good a signal-to-noise ratio.

Advantageously, the estimating of the Doppler effect affecting the signal L2 consists in extracting from the signal L1 from the relevant GPS satellite, modulated by a known C/A spreading code, the Doppler shift affecting the carrier of the signal L1 and in applying a proportionality ratio of 120/154th to this Doppler shift.

The subject of the invention is also a device for implementing the aforesaid method.

BRIEF DESCRIPTION OF THE DRAWINGS

Other characteristics and advantages of the invention will become apparent from the description hereinbelow of embodiments of the invention which are given by way of example. This description will be given in conjunction with the drawing in which.

For the purpose of simplification, elements which are identical from one figure to another carry the same indexations.

DESCRIPTION OF THE PREFERRED EMBODIMENTS

Figure 1:
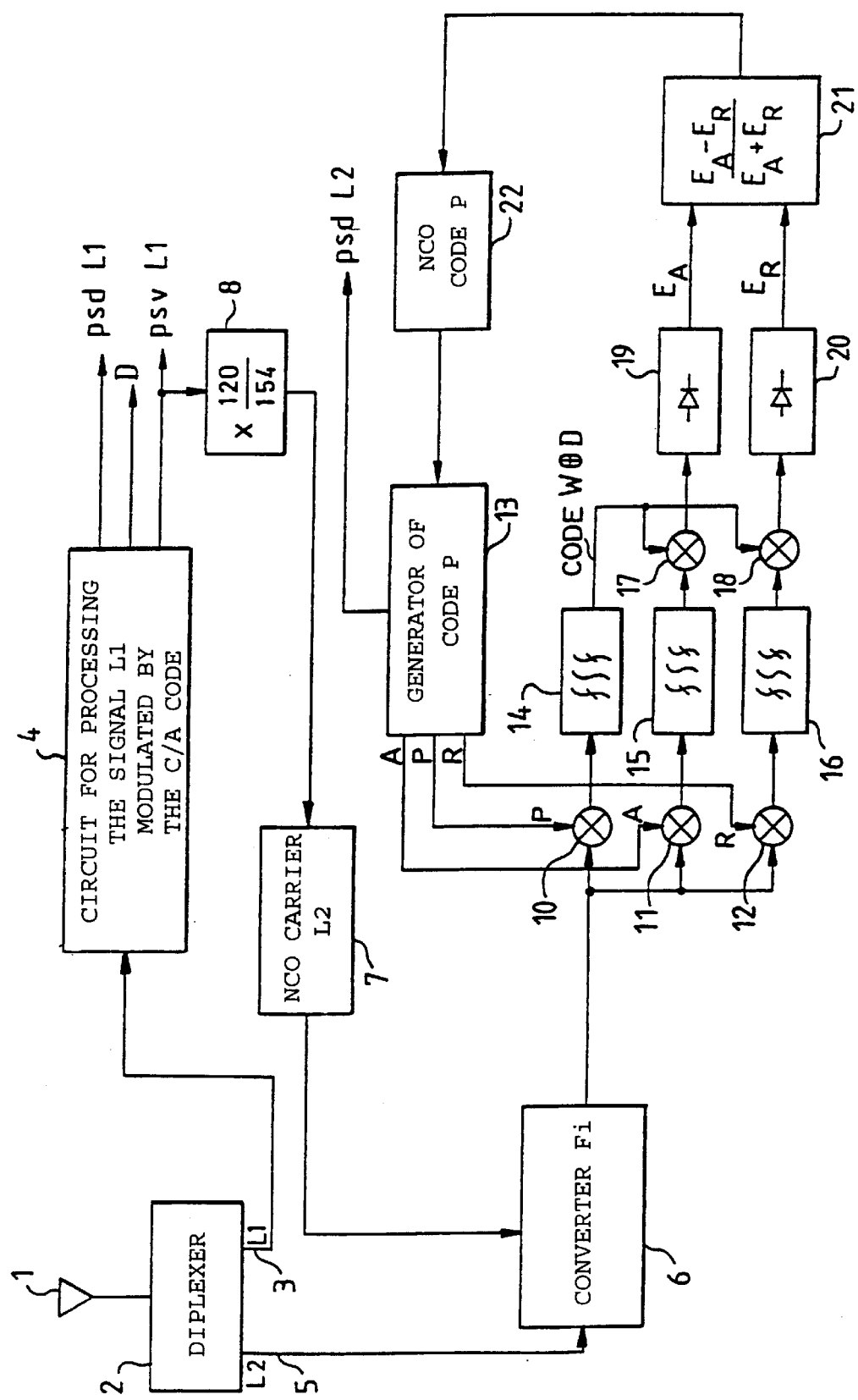
FIG. 1 is a diagram of a GPS receiver according to the invention, providing for a processing of the signal L2 in intermediate frequency band.

Reference is firstly made to FIG. 1 which shows the diagram of a GPS receiver according to the invention, detailing more particularly its circuits providing for the processing of the signal L2 in intermediate frequency band. Distinguished therein firstly is a reception antenna 1 via which the receiver receives the collection of signals L1 and L2 emitted by the GPS satellites which are in direct line of sight. This reception antenna 1 is connected to a diplexer 2 which separates the signals L1 and L2 via their distinct frequency bands.

The signal L1 available at the output 3 of the diplexer 2 is applied to a conventional processing circuit 4 which demodulates it using a C/A spreading code and derives from it:

the phase for adjusting the C/A spreading code generator used locally in the receiver, which corresponds to the reception phase of the C/A spreading code modulating the signal L1 received, the data D from the GPS satellite using the relevant C/A spreading code, and the Doppler frequency shift affecting the signal L1 received.

The phase for adjusting the C/A spreading code generator used locally in the receiver gives an indication of the pseudodistance (psd) separating the receiver from the GPS satellite in direct line of sight using the relevant C/A spreading code.

The satellite data D obtained after demodulating the signal L1 using a C/A spreading code consist of ephemerides and of an almanach making it possible to calculate very accurately the position of the GPS satellite at a given instant.

The Doppler frequency shift (psv) affecting the signal L1 received makes it possible to ascertain the relative speed of the receiver with respect to the GPS satellite using the relevant C/A spreading code.

No further details will be given regarding the signals obtained from demodulating the GPS satellite signal L1 using a C/A spreading code and regarding their utilization with a view to location finding since this stems from the GPS-based location finding technique which is well known to the person skilled in the art and does not form part of the invention which is concerned more particularly with the processing of the signal L2.

The signal L2 available at the output 5 of the diplexer 2 is applied to the input of an intermediate frequency converter 6 whose role is to transpose the signal L2 to a lower frequency band so as to facilitate the processing thereof. The last stage of this intermediate frequency converter 6 is driven by a numerical phase control oscillator NCO 7 whose frequency is movable and shifted, around a fixed value, by the Doppler effect affecting the signal L2. This Doppler effect affecting the signal L2 is deduced from the Doppler effect affecting the signal L1 by a scaling bringing in the proportionality ratio of 120/154th which exists between the carriers of the signals L1 and L2. To do this, the signal (psv) is tapped off at the output of the processing circuit 4 which represents the Doppler frequency discrepancy affecting the signal L1, it is applied to a multiplier 8 which implements the proportionality ratio 120/154th and the result is used to operate the phase control input of the oscillator 7.

At the output of the intermediate frequency converter 6, the signal L2 which exhibits a passband of the order of 20 MHz is centred on a fixed intermediate frequency Fi. It is then submitted in parallel to three demodulators 10, 11, 12 which receive as demodulation signals a precise version P and two versions advanced A and delayed R by half a binary element of a non-encrypted spreading code P produced by a local generator 13 of spreading code P. The three resulting demodulated signals are filtered by bandpass filters 14, 15, 16 of bandwidth 500 kHz which are centred on the fixed intermediate frequency Fi and matched to the phase and to the frequency of the binary encryption signal W. The demodulated and filtered signals available at the output of the bandpass filters 15 and 16, resulting from the demodulations by the advanced A and delayed R versions of the locally produced non-encrypted spreading code P are once again submitted to two demodulators 17, 18 which demodulate them once again using the demodulated signal available at the output of the bandpass filter 14 resulting from the demodulation of the signal L2 by the precise version P of the locally produced non-encrypted spreading code P. The two doubly demodulated signals available at the output of the demodulators 17, 18 are then applied to circuits 19 and 20 for measuring the powers $E_A$, $E_R$ of their component at the intermediate fixed frequency Fi which operates on a horizon of a few milliseconds. These power measurements $E_A$ and $E_R$ are then applied as inputs to a discriminator 21 which drives the phase-shift control input of a numerical phase control oscillator NCO 22 delivering a binary element clocking signal to the local generator 13 of the non-encrypted spreading code P.

When the local generator of the non-encrypted spreading code P is in phase with the spreading code Y (encrypted P) modulating a signal L2 originating from a GPS satellite, a despread signal L2 modulated only by the encryption code W and the data D is retrieved at the output of the demodulator 10 corresponding to the precise version P of the non-encrypted spreading code P. This signal, which has seen its passband pass from 20 MHz to around 500 kHz, can then advantageously be subjected to the bandpass filter 14 of 500 kHz bandwidth, matched to the phase and to the frequency of the binary encryption signal W, so as to eliminate the off-band noise.

In the same way, when the local generator of the non-encrypted spreading code P is in phase with the spreading code Y (encrypted P) modulating a signal L2 originating from a GPS satellite, signals L2 which are imperfectly despread by reason of the advanced or delayed phase-shifts of half a binary element of the locally produced non-encrypted spreading code P, which are still modulated by the binary encryption code W and by the data D, are retrieved at the output of the demodulators 11 and 12 corresponding to the advanced A and delayed R versions of the non-encrypted spreading code P. Since, in the output signals from the demodulators 11 and 12, one is interested only in the bandwidth occupied by the data D modulated by the encryption code W, which does not exceed 500 kHz, it is also advantageous to submit them to the bandpass filters 15 and 16 of 500 kHz bandwidth, which are matched to the phase and to the frequency of the encryption signal W, so as to eliminate the off-band noise.

It is noted here that, by reason of the half binary element advanced or delayed phase shifts of the advanced A and delayed R versions of the locally produced non-encrypted spreading code P, the amplitudes of the signals at the output of the bandpass filters 15 and 16 are halved with respect to that of the signal at the output of the bandpass filter 14.

Hence, at the output of the bandpass filters 15 and 16 one has signals at the fixed intermediate frequency Fi which are modulated mainly by the encryption code W and by the data D. Since this modulation is undesirable for the synchronization locking of the local generator of the non-encrypted spreading code P, it is deleted from the advanced and delayed paths by demodulating these paths using the precise path by virtue of the demodulators 17 and 18.

At the output of the second demodulators 17 and 18 one has completely demodulated signals consisting of a spectral line at the fixed intermediate frequency Fi emerging from a noise band of width 500 kHz. It is then possible, as usual, to succeed in synchronizing the local generator 13 of the non-encrypted spreading code P by locking its phase in such a way as to obtain spectral lines of like power on the two advance and delay paths.

It is noted that it would have been equally possible to eliminate the biphase modulations of the advance and delay paths by squaring their signals. However, this would be done to the detriment of the signal-to-noise ratio since a signal of better quality is available on the precise path than on the advance and delay paths. It is also noted that by using two parallel and simultaneous advance and delay paths it is possible to improve the power of the signal used for the phase locking of the local generator 13 of the non-encrypted spreading code P.

From the phase shift of the local generator 13 of the non-encrypted spreading code P is deduced, when the phase lock loop is latched, the pseudodistance (psd) of the signal L2. The comparison between the pseudodistances (psd) measured with the signals L1 and L2 gives the relative delay during reception of the signal L2 with respect to the signal L1, thereby making it possible to estimate the effects of the ionosphere on the propagation times of the signals L1 and L2 so as to take account thereof in the location finding.

Figure 2:
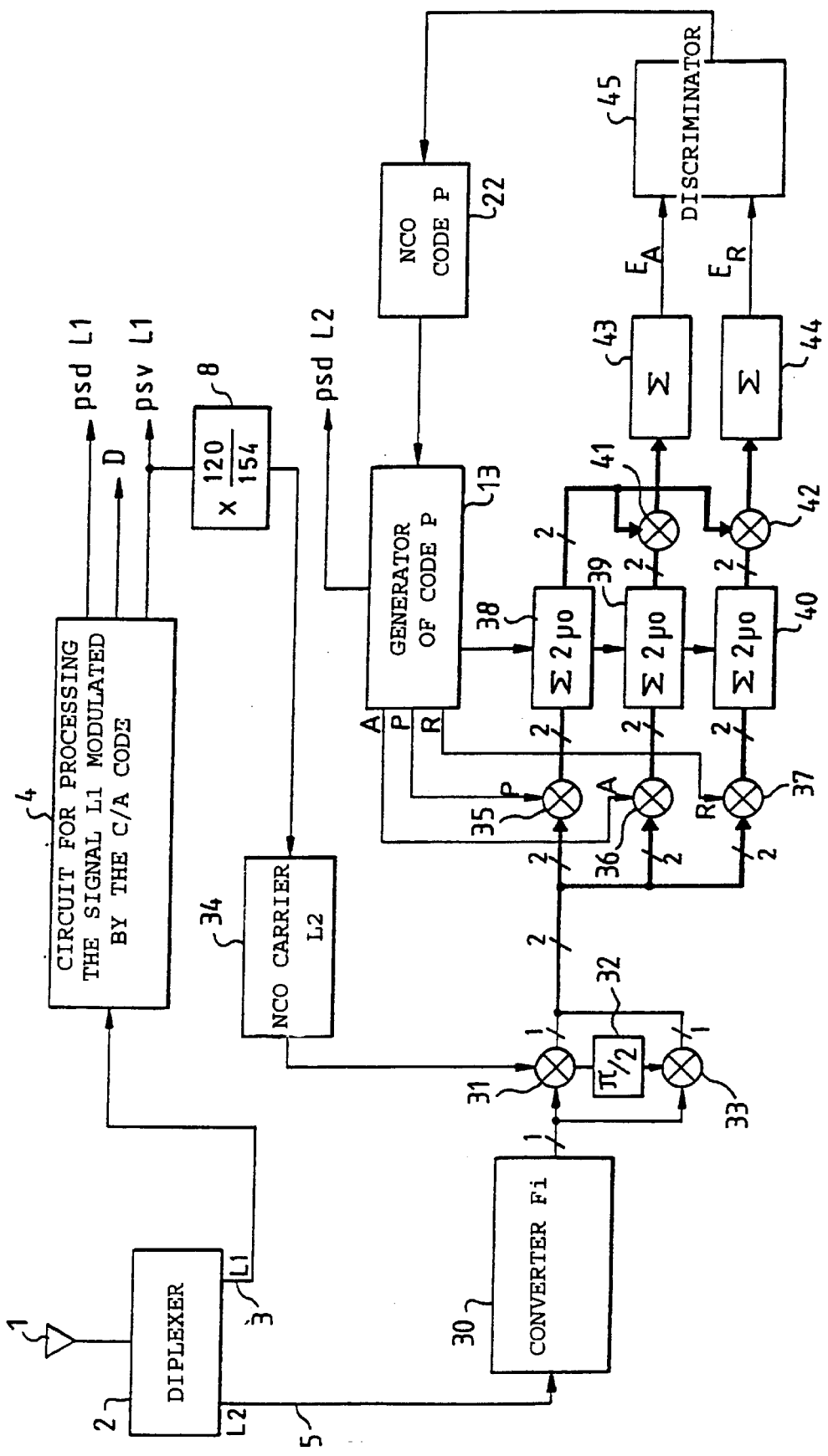
FIG. 2 is a diagram of another GPS receiver according to the invention, providing for a processing of the signal L2 in baseband.

FIG. 2 illustrates a variant of a GPS receiver in which the signal L2 is reduced to baseband before being used to synchronize a local generator of the non-encrypted spreading code P.

In this FIG. 2 may be distinguished, as before, a reception antenna 1 leading to a diplexer 2 which separates the distinct frequency bands of the signals L1 and L2 emanating from a GPS satellite. The signal L1 available at the output 3 of the diplexer 2 is again applied to a conventional processing circuit 4 which demodulates it using a C/A spreading code appropriate to the GPS satellite which one wishes to receive and which derives the usual information therefrom, namely: the phase for adjusting the generator which locally produces the C/A spreading code which gives an indication (psd) of pseudodistance with respect to the GPS satellite being listened to, the data D from the GPS satellite being listened to, consisting of the ephemerides and of an almanach making it possible to pinpoint its position very accurately at a given instant and the Doppler shift (psv) affecting the signal L1 received giving the relative speed of the receiver with respect to the GPS satellite being listened to.

The signal L2 available at the output 5 of the diplexer 2 is applied to an intermediate frequency converter 30 which carries out a translation of the signal L2 into lower band in one or more steps with the aid of fixed pilot frequencies. On exiting the intermediate frequency converter 30, the signal L2 is subjected to a quadrature demodulator translating it into baseband. This quadrature demodulator is composed of two demodulators 31, 33 and of a π/2 phase-shifter 32. The two demodulators 31, 33 receive the in-phase and quadrature versions of a carrier slightly shifted by the intermediate frequency Fi so as to take into account the Doppler effect on the signal L2. This baseband transposition carrier is delivered by a numerical phase control oscillator NCO 34 whose numerical phase control input receives, by way of a multiplier 8 introducing a proportionality ratio 120/154th, the signal (psv) which is available at the output of the circuit 4 for processing the signal L1 modulated by the C/A spreading code and which represents the frequency shift due to the Doppler effect affecting the signal L1.

At the output of the quadrature demodulator 31, 32, 33 the two components, in-phase I and quadrature Q, of the baseband signal L2 are submitted in parallel to three double demodulators (complex signal) 35, 36, 37 which receive, as demodulating signals, a precise version P and two versions advanced A and delayed R by half a binary element, of a non-encrypted spreading code P produced by a local generator 13. The three resulting demodulated signals with two components, one in-phase and the other quadrature, are submitted to double low-pass filters 38, 39, 40 matched to the phase and to the frequency of the encryption signal W, which limit the bandwidth of the demodulated signals to 500 kHz while integrating them over a period of 2 μs.

The in-phase and quadrature components of the demodulated and filtered signals available at the output of the double low-pass filters 39, 40 and resulting from the demodulating of the signal L2 by the advanced A an delayed R versions of the locally produced non-encrypted spreading code P are submitted once again to two double demodulators 41, 42 which again demodulate them using the in-phase and quadrature components of the demodulated signal available at the output of the double low-pass filter 38 and resulting from the demodulating of the signal L2 by the precise version P of the locally produced non-encrypted spreading code P.

The in-phase and quadrature components of each of the two doubly demodulated signals available at the output of the double demodulators 41, respectively 42 are then submitted to a power estimation circuit 43, respectively 44 which integrates them over a horizon of a few milliseconds and extracts therefrom the modulus $E_A$, respectively $E_R$ of each of the signals. These moduli $E_A$ and $E_R$ are then applied to a discriminator 45 which drives the phase-shift control input of a numerical phase control oscillator NCO 22 delivering a binary element clocking signal to the local generator 13 of the non-encrypted spreading code P.

When the generator of the non-encrypted spreading code P is in phase with the spreading code Y (encrypted P) modulating the signal L2 originating from a GPS satellite, the satellite data D modulated by the encryption code W are retrieved at the output of the demodulator 35 corresponding to the precise version of the non-encrypted spreading code P. The in-phase and quadrature components of this signal which have a passband limited to around 500 kHz are then advantageously submitted to the double low-pass filter 38 matched to the phase and to the frequency of the encryption signal W, which limits the bandwidth of the useful signal to 500 kHz so as to eliminate the off-band noise.

In the same way, when the local generator 13 of the non-encrypted spreading code P is in phase with the spreading code Y (encrypted P) modulating a signal L2 originating from a GPS satellite, the in-phase and quadrature components of signals corresponding to imperfectly despread versions of the signal L2 by reason of the advanced or delayed half binary element phase-shifts of the non-encrypted spreading code P, which correspond to the satellite data D modulated by the encryption code W and mixed with noise, are retrieved at the output of the demodulators 36 and 37 corresponding to the advanced A and delayed R versions of the non-encrypted spreading code P. Since, in these two imperfectly despread versions of the signal L2, one is interested only in the bandwidth occupied by the data D modulated by the encryption code W, which does not exceed 500 kHz, it is also useful to eliminate the off-band noise by passage through the double low-pass filters 39 and 40 matched to the phase and to the frequency of the encryption signal W.

At the output of the double low-pass filters 38, 39, 40, one has the more or less noisy in-phase and quadrature components of signals containing the data D modulated by the encryption code W. Since these data D modulated by the encryption code W are undesirable for the synchronization locking of the local generator of the non-encrypted spreading code P, they are deleted from the advance and delay paths by demodulating these paths using the precise path by virtue of the double demodulators 41, 42.

At the output of the second double demodulators 41, 42, on each advance and delay path one has the in-phase and quadrature components of completely demodulated signals now containing only one noisy continuous component representing the amplitude of the carrier of the signal L2 received, and which is picked up in one case with a non-encrypted local spreading code P advanced by half a binary element and in the other case with a non-encrypted local spreading code P delayed by half a binary element. It is then possible, as usual, to obtain the synchronization of the local generator of the non-encrypted spreading code P by locking its phase in such a way as to obtain on each of the advance and delay paths one and the same reception power for the carrier of the signal L2. This is achieved with the aid of the power estimation circuits 43, 44, of the discriminator 45 and of the numerical phase control oscillator 22.

From the phase shift of the local generator 13 of the non-encrypted spreading code P is deduced, when the phase lock loop is latched, the pseudodistance (psd) of the signal L2. The comparison of the pseudodistances (psd) measured with the signals L1 and L2 gives the relative delay during reception of the signal L2 with respect to the signal L1, thereby making it possible to estimate the effects of the ionosphere in the direction of the satellite targeted on the propagation times of the signals L1 and L2 so as to take account thereof in the location finding.

Advantageously, the reception processings of the signals L1 and L2 are carried out digitally as soon as they have been translated into a sufficiently low frequency band, by virtue of an analogue/digital conversion effected immediately after output from the intermediate frequency converters.

The filters matched to the phase and to the frequency of the encryption signal w 14, 15, 16, 38, 39, 40 may be constructed, in an optimal manner, according to the technique known by the name of "integrate and dump", which consists in integrating the signal processed over adjacent time windows, around 2 μs wide, synchronized with the signal from the local generator of the non-encrypted spreading code p.

What is claimed is:

1. Method for deducing a pseudodistance to a GPS satellite by reception processing of a GPS satellite signal L2 modulated by an encrypted spreading code Y encrypted by an encryption signal W not available from the GPS satellite, comprising:

estimating a Doppler effect affecting the GPS satellite signal L2;

transposing the GPS satellite signal L2 into a lower frequency band by utilizing at least one fixed carrier signal produced locally and translated by an expected Doppler shift of the GPS satellite signal L2;

demodulating in parallel on three paths the transposed GPS satellite signal L2 with advanced, precise, and delayed versions of a non-encrypted spreading code P produced by an adjustable-phase spreading code local generator, thereby producing respective advanced, precise, and delayed demodulated signals;

filtering the respective demodulated signals with a filter matched to a phase and to a frequency of the encryption signal W;

re-demodulating the advanced and delayed demodulated signals with the precise demodulated signal so as to delete biphase modulation and to produce two doubly demodulated signals;

calculating respective powers of the two doubly demodulated signals;

locking a phase of the adjustable-phase spreading code local generator when the two doubly demodulated signals are of equal powers; and deducing a pseudodistance to the GPS satellite from a difference in said phase of the adjustable-phase spreading code local generator when said generator is locked and a phase of the GPS reception signal L1.

2. Method according to claim 1, wherein the step of estimating of a Doppler effect affecting the GPS satellite signal L2 comprises:

extracting from the GPS satellite signal L1, modulated by a known coarse acquisition C/A spreading code, a Doppler shift affecting the carrier of the signal L1; and applying a proportionality ratio of 120/154th to the Doppler shift affecting the carrier of the signal L1.

3. Method according to claim 1, wherein the step of transposing the signal L2 into a lower frequency band is carried out in an intermediate frequency band.

4. Method according to claim 1, wherein the step of transposing the signal L2 into a lower frequency band is carried out in a baseband with, as final step, a quadrature demodulator delivering two baseband components, one in-phase and another in quadrature.

5. Method according to claim 1, wherein the step of filtering utilizes filters limited to passbands around 500 kHz.

6. A device for reception processing of a GPS satellite signal L2 modulated by an encrypted spreading code P encrypted by an encryption signal W not available from the GPS satellite, comprising:

an estimator configured to estimate the Doppler effect affecting the GPS satellite signal L2 received from a GPS satellite;

a transposing circuit configured to transpose the GPS satellite signal L2 into a lower frequency band by utilizing a fixed carrier signal produced locally and translated by an expected Doppler shift of the signal L2;

a first demodulator configured to demodulate, in parallel on three paths, the transposed GPS satellite signal L2 with advanced A, precise P and delayed R versions of a non-encrypted spreading code P produced by an adjustable-phase spreading code local generator, thereby producing respective advanced, precise, and delayed demodulated signals;

a bandpass filter configured to filter the respective demodulated signals with a filter matched to a phase and to a frequency of the encryption signal W;

a second demodulator configured to demodulate the advanced and delayed demodulated signals with the precise demodulated signal so as to delete biphase modulation and produce two doubly demodulated signals;

a calculator configured to calculate respective powers of the two doubly demodulated signals; and a phase locker configured to lock a phase of the adjustable-phase spreading code local generator when the two redemodulated signals are of equal powers.

7. Device according to claim 6, wherein said estimator comprises:
a circuit configured to process the GPS satellite signal L1, modulated by a known coarse acquisition C/A spreading code and to deliver a value of a Doppler shift affecting a carrier of the signal L1; and
a multiplier circuit configured to apply a proportionality ratio of 120/154th to the Doppler shift affecting the carrier of the signal L1.

8. Device according to claim 6, wherein the transposing circuit transposes the signal L2 into an intermediate frequency band.

9. Device according to claim 6, wherein the transposing circuit transposes the signal L2 into a baseband.

10. Device according to claim 6, wherein the bandpass filter is an integrate and dump filter and is synchronized by the adjustable-phase spreading code local generator.

11. Device according to claim 6, wherein the bandpass filter is limited to passbands around 500 kHz.

* * * * *